US005537372A

United States Patent [19]
Albrecht et al.

[11] Patent Number: 5,537,372
[45] Date of Patent: Jul. 16, 1996

[54] HIGH DENSITY DATA STORAGE SYSTEM WITH TOPOGRAPHIC CONTACT SENSOR

[75] Inventors: Thomas R. Albrecht, San Jose; Harry J. Mamin; Daniel Rugar, both of Palo Alto, all of Calif.

[73] Assignee: International Business Machines Corporation, Armonk, N.Y.

[21] Appl. No.: 158,043

[22] Filed: Nov. 24, 1993

Related U.S. Application Data

[63] Continuation of Ser. No. 792,944, Nov. 15, 1991, abandoned.
[51] Int. Cl.$^6$ ...................................................... G11B 7/00
[52] U.S. Cl. ............................ 369/43; 369/127; 369/128; 250/306
[58] Field of Search .................................. 250/306, 307; 369/43, 44.26, 127, 153, 154, 173, 128, 132, 142, 113, 114, 115; 365/151, 128

[56] References Cited

U.S. PATENT DOCUMENTS

| | | | |
|---|---|---|---|
| 1,793,403 | 12/1927 | Hutt . | |
| 4,160,268 | 7/1979 | Goto et al. | 358/128 |
| 4,363,116 | 12/1982 | Kleuters et al. | 369/30 |
| 4,425,636 | 1/1984 | Musha et al. | 369/109 |
| 4,663,753 | 5/1987 | Goldstein | 369/132 |
| 4,907,195 | 3/1990 | Kazan et al. | 250/306 |
| 5,107,114 | 4/1992 | Nishioka et al. | 250/306 |
| 5,132,934 | 7/1992 | Quate et al. | 365/174 |
| 5,144,581 | 9/1992 | Toda et al. | 250/306 |
| 5,144,833 | 9/1992 | Amer et al. | 250/306 |
| 5,155,715 | 10/1992 | Ueyema et al. | 369/44.26 |

FOREIGN PATENT DOCUMENTS 0360337  3/1990  European Pat. Off. ............... 369/109

OTHER PUBLICATIONS

"Control Electronics for Atomic Force Microscopy" O. Marti et al., Rev. Sci. Instrum. 5916), Jun. 1988.
"Atomic Force Microscope" G. Binnig, C. F. Quate, Ch. Gerber, Physical Review Letters, vol. 56, No. 9 (Mar. 3, 1986).
"Novel optical approach to atomic force microscopy", G. Meyer, N. M. Amer, Appl. Phys. Lett. 53(12) (Sep. 19, 1988).
"From atoms to integrated circuit chips, blood cells, and bacteria with the atomic force microscope", S. A. C. Gould et al., J. Vac. Sci. Technol. A 8(1) (Jan./Feb. 1990).
"Microfabrication of cantilever styli for the atomic force microscope", T. R. Albrecht
S. Akamine, T. E. Carver, C. F. Quate, J. Vac. Sci. Technol. A 8(4) (Jul./Aug. 1990).
"Simultaneous measurement of lateral and normal forces with an optical–beam–deflection atomic force microscope", G. Meyer, N. M. Amer, Appl. Phys. Lett. 57(20) (Nov. 12, 1990).
"High–speed, large–scale imaging with the atomic force microscope", R. C. Barrett, C. F. Quate, J. Vac. Sci. Technol. B 9(2) (Mar./Apr. 1991).

Primary Examiner—Georgia Y. Epps
Assistant Examiner—P. W. Huber
Attorney, Agent, or Firm—Baker, Maxham, Jester & Meador

[57] ABSTRACT

A high density data storage system includes a rotatable storage medium mounted to rotate about a drive axis, the storage medium having formed thereon a surface topography defining machine readable information. The storage system further includes a high resolution contact sensor having a cantilever arm and a stylus mounted at one end of the cantilever arm. The stylus is positionable to engage the storage medium and follow the surface topography when the storage medium is rotated. A detector system provides an output signal representing cantilever deflection caused by changes in the surface topography of the storage medium.

55 Claims, 4 Drawing Sheets

HIGH DENSITY DATA STORAGE SYSTEM WITH TOPOGRAPHIC CONTACT SENSOR

This is a FILE WRAPPER CONTINUATION of application Ser. No. 07/792,944 filed Nov. 15, 1991, abandoned.

BACKGROUND OF THE INVENTION

The present invention relates to high density data storage apparatus for use in digital processing, and, more particularly, to a data storage system for transferring information between a data processing resource and a topographically altered storage medium.

The need to increase the areal density in data storage devices is critical. This need drives much of the current research in micromagnetics, coding theory and head design, to name just a few areas of inquiry. Although data storage densities of one gigabit per square inch ($Gbit/in^2$) have been achieved with magnetic recording, and several $Gbit/in^2$ have been obtained using optical recording, there has existed no path to achieving densities substantially in excess of ten $Gbit/in^2$.

Accordingly, while much progress has been made in increasing data storage densities using magnetic and optical techniques, there is still a need for a storage device offering significantly improved storage capability with corresponding high data access rates for rapid read/write operations.

SUMMARY OF THE INVENTION

It is therefore a primary object of the present invention to provide a data storage system offering the potential of not just incremental increases in areal density, but improvements of several orders of magnitude over that of current magnetic and optical data storage systems. It is a further object of the invention to provide a data storage system with the capability to read and write information at an areal density of at least 20 $Gbit/in^2$. A still further object of the present invention is to provide high data storage densities in conjunction with rapid data read rates, for example, in the megabit per second range.

To that end, a mechanical data storage system is provided that includes a rotatable storage medium mounted for rotation about a drive axis, and having formed thereon a surface topography representing machine readable information. The storage system further includes a high resolution contact sensor having a microfabricated cantilever arm and a stylus mounted at one end of the cantilever arm. The stylus is positionable to engage the storage medium and follow the surface topography when the storage medium is rotated. A detector system provides an output signal representing cantilever deflections caused by changes in the surface topography of the storage medium.

BRIEF DESCRIPTION OF THE DRAWINGS

The foregoing and other objects, features and advantages of the invention will be apparent from the following detailed description of exemplary embodiments thereof, when read in conjunction with accompanying drawing, in which.

DESCRIPTION OF THE PREFERRED EMBODIMENTS

Figures 1, 2:
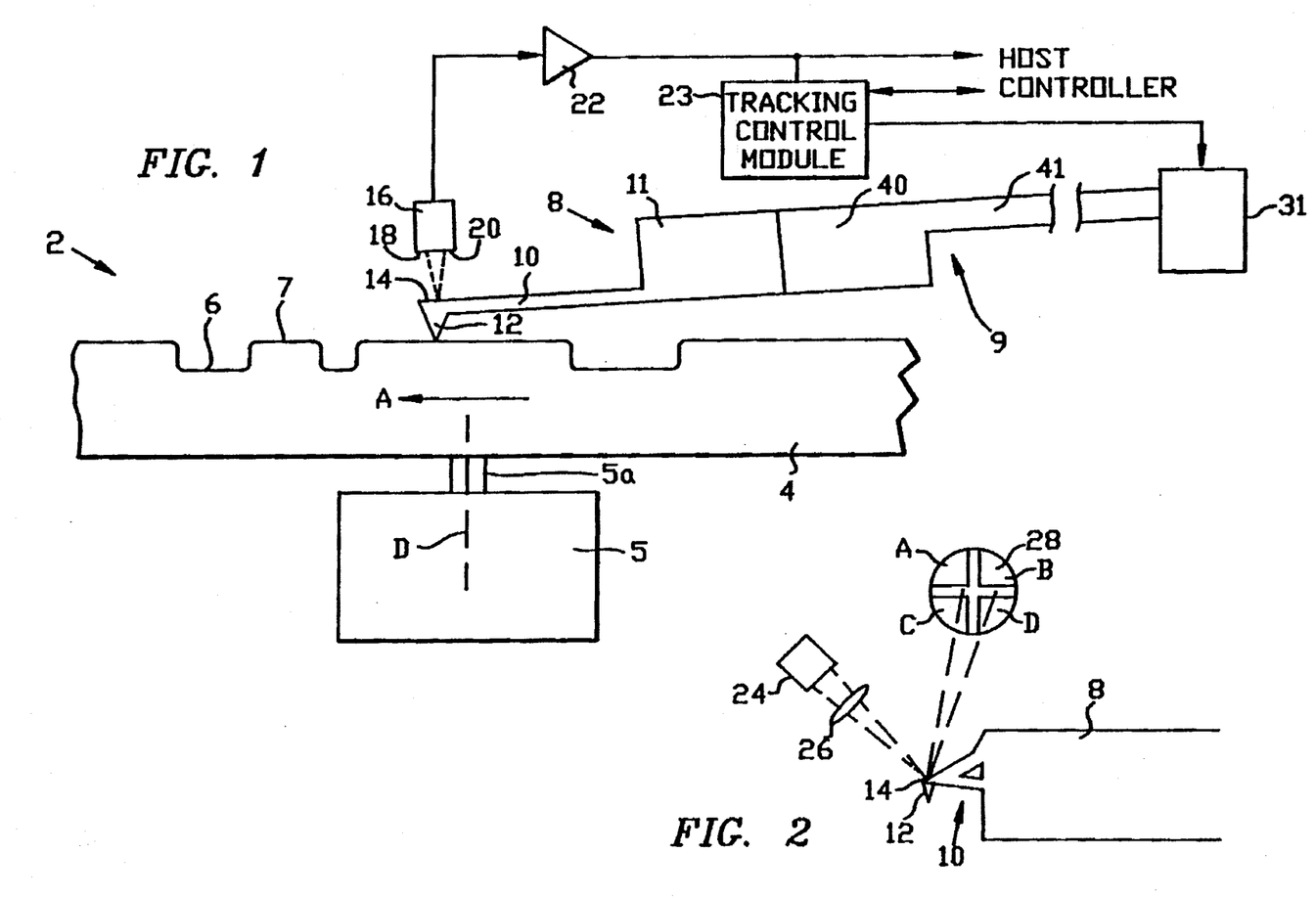
FIG. 1 is a diagrammatic side view of high density data storage system constructed in accordance with the present invention.
FIG. 2 is a detailed diagrammatic view of an optical light source and detection module constructed in accordance with the present invention.

Turning now to FIG. 1, which is diagrammatic in nature and not to scale, a data storage system 2 includes a rotatable storage medium 4 which may be generally disk-shaped and mounted for rotation about a central drive axis in the direction of the arrow labeled A. Although the storage medium may be formed from many conventional materials, a polymer such as one of the methylmethacrylates, PMMA for example, is preferred. There is formed on the upper face of the storage medium 4 a surface topography defining machine readable information. The phrase "machine readable information" is understood herein to mean information that is readable by a digital processing resource such as a programmed computer. More specifically, a plurality of data tracks are provided having a series of surface incongruances arranged in a machine readable pattern. The incongruances may be a series of pits or indentations 6 separated by island portions 7 of the media surface that are not pitted. Alternatively, instead of pits, a series of raised protruberances or bumps could be provided. In either case, the incongruances may be selectively spaced or of variable length in a frequency modulated encoding mode, or may be varied in depth in an amplitude modulated encoding mode. Positioned below the storage medium 4 is a drive motor 5 of conventional design for rotating a spindle 5a that supports the medium 4. The medium is rotated at a selected uniform rotational speed about the drive axis D, shown in phantom lines. Positioned adjacently above the storage medium 4 is a high resolution contact sensor 8 mounted to a support system 9. The contact sensor 8 includes a microfabricated cantilever arm 10 extending at one end from a base 11. A stylus 12 is mounted at the other end of the cantilever arm. The stylus 12 is positionable to engage a selected data track of the storage medium 4 and to follow the data track when the storage medium is rotated. The stylus is downwardly biased so that it tracks the surface topography of the data track over which it is located. When the disk is rotated, the cantilever arm 10 rises and falls as the stylus 12 tracks through the peaks and valleys of the storage medium.

Positioned on the back side of the cantilever arm 10, adjacently above the stylus 12, is a light reflective surface 14 having a smooth mirror facet for reflecting laser light without substantial distortion. Positioned above the light reflective surface 14 is an optical light source and detection module 16. The module 16 includes a laser light source 18 and an adjacent light detector 20. The light source 18 is positioned to direct an incident laser beam on the reflective surface 14 while the detector 20 is positioned to receive the reflected beam. The light source/detection module 16 is electrically connected to circuitry 22 for processing the output signal of the detector to provide a data signal and a tracking error signal. The data signal is directed to a host controller such as a digital computer and the tracking error signal is directed to a tracking control module 23.

Figure 3A:
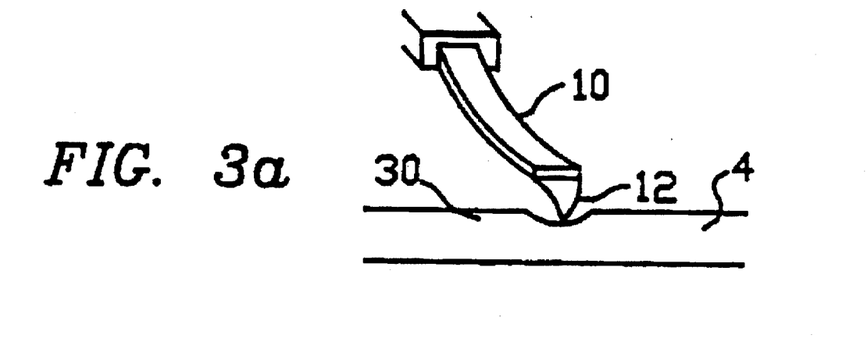
FIG. 3a is a diagrammatic view of a control sensor stylus engaging a topographic incongruance in an on-track orientation.
Figure 3B:
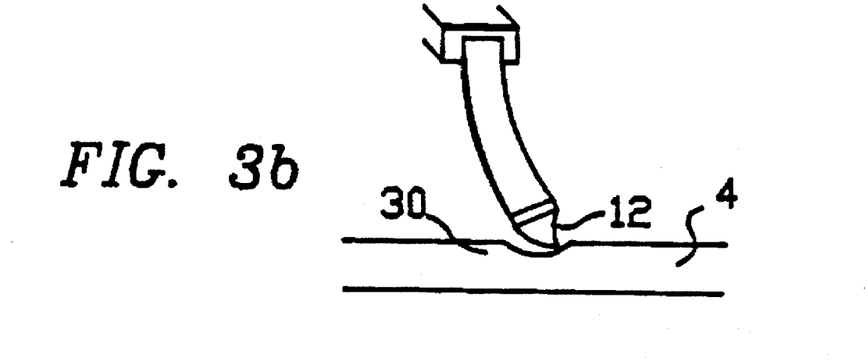
FIG. 3b is a diagrammatic view of a control sensor stylus engaging a topographic incongruance on a storage medium in a first off-track position.
Figure 3C:
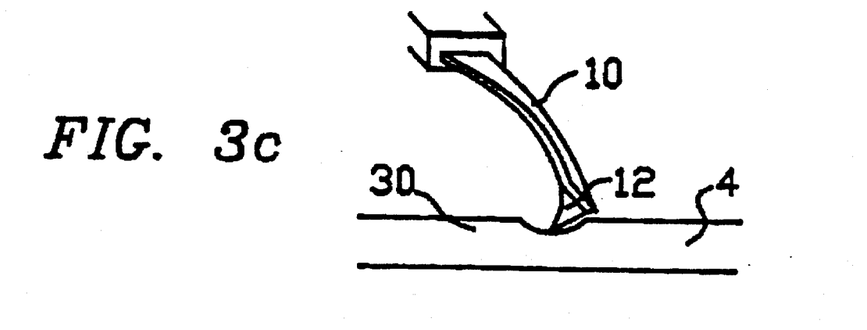
FIG. 3c is a diagrammatic view of a control sensor stylus engaging a topographic incongruance of a storage medium an a second off-track position.

Referring now to FIG. 2, the optical source/detection module 16 and its interaction with the control sensor 8 are illustrated in greater detail. The optical source 18 may include a semiconductor laser device 24 of conventional design in combination with a focusing lens 26. The light detector 20 may include a conventional quadrant cell ("quad-cell") photodiode having four detector segments A, B, C, and D. The quadrant detector 28 is able to sense vertical displacement of the cantilever arm 10 caused by the peaks and valleys of the medium, as well as cantilever twist caused by an off-track condition of the stylus 12. This condition is illustrated in FIGS. 3a, 3b and 3c. In each of these Figures the media is illustrated in section and is moving normal to the plane of the page. The storage medium 4 is shown as having a rounded incongruance 30 over which the stylus 12 of the cantilever arm is drawn as a result of the relative movement between the storage medium and the stylus. The incongruance 30 is formed to have a rounded valley aligned with the center of the data track in which the incongruance is located, and a pair of rounded side surfaces extending away from the valley in the direction of either side of the data track. Although FIGS. 3a–3c illustrate a depression, it will be appreciated that the incongruance could be raised to form a rounded geometry that is essentially a mirror image of that of the concave incongruance 30. FIG. 3a shows a condition where the stylus 12 is properly positioned in the center of the data track and therefore rides over the peak of the incongruance 30. FIG. 3b represents an off-track condition wherein the stylus 12 is positioned on one side of the track center line such that the stylus 12 rides over a lateral portion of the incongruance 30. This imparts a twist to the cantilever arm 10. Similarly, FIG. 3c shows the condition wherein the stylus 12 is positioned on the other side of the track center line which again causes the cantilever arm 10 to twist.

Returning now to FIG. 2, the light source 24 and quadrant detector 28 may be arranged so that vertical deflections of the cantilever arm 10 caused by the topography of the storage medium 4 will result in a lateral displacement of the reflected laser beam across the quadrant detector 28 (up and down in FIG. 2). Likewise, cantilever twisting resulting from an off-track condition of the stylus 12 will result in lateral deflection of the reflected laser beam across the quadrant detector 28 in a direction 90 degrees from the beam deflection resulting from vertical cantilever arm displacement (left and right in FIG. 2). As is conventional, the quadrant segments A, B, C, and D each represent a discreet photodiode detector which generates an electrical output signal having an intensity proportional to the intensity of the incident light. The circuitry 22 includes circuit elements for determining differences in the output levels of the discrete photodiodes. By properly positioning the quadrant detector 28 with respect to the cantilever arm reflector 14, changes in the vertical displacement of the cantilever arm can be directly calculated by the relationship:

$$\frac{(A+B)-(C+D)}{A+B+C+D} \qquad \text{Formula I}$$

Similarly, changes in the twist of the cantilever arm 10 can be directly calculated in accordance with the relationship:

$$\frac{(A+C)-(B+D)}{A+B+C+D} \qquad \text{Formula II}$$

Thus, the optical source/detection module 16 and circuitry 22 function as a data signal/tracking error signal generating system. The output signal from the detection module 16 is processed by circuitry 22 in accordance with Formulas I and II above to provide a data signal and a tracking error signal, respectively. The data signal component is directed to the host controller. The tracking error signal is directed to the tracking control module 23 for generating a servo signal that controls the position of the contact sensor 8 over a selected data track on the storage medium 4. Cantilever support system 9 includes a drive system 31 which is connected to the tracking control module 23 and is capable of gross and fine movements for track location and track servo operations, respectively. In addition, the drive system 29 includes a conventional piezoelectric control system for controlling cantilever loading.

Figure 4:
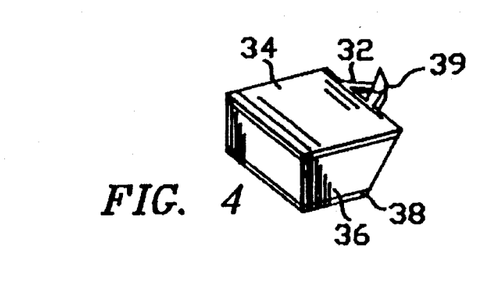
FIG. 4 is a perspective view of a contact sensor constructed in accordance with the present invention showing the underside thereof.

In order to sample high density data at high data rates, a contact sensor, such as the sensor 8 in FIG. 1, is preferably formed using microfabrication techniques such as those used to form the atomic force microscope (AFM). Thin film cantilevers can be formed from a variety of materials, including thermally grown oxide films and vapor deposited metals or dialectrics. FIG. 4 illustrates a conventional cantilever design which may be used advantageously to form the contact sensor 8 shown in FIG. 1. In FIG. 4, a generally triangular, dual-legged free cantilever 32 arm extends from a cantilever base 34 mounted on a substrate 36. In accordance with conventional constructions, the cantilever 32 arm and support base 34 may be produced from $SiO_2$ or $Si_3N_4$, thermally grown on a substrate 36 by low-pressure chemical vapor deposition (LPCVD). The substrate 36 may be formed from silicon wafer material. Following appropriate etching, it provides a support for the cantilever base 34 while leaving the cantilever arm 32 free for relative movement. An additional lower layer 38 formed from thermally-grown $SiO_2$ or $Si_3N_4$ may be provided on the bottom of the substrate 36 for additional support and to facilitate handling of the cantilever and mounting to the tracking arm 9. To complete the control sensor, a stylus 39 is formed at the end of the cantilever arm 32. Many techniques are known for stylus fabrication. In a preferred method, the stylus 39 is integrally formed with the cantilever arm 32 by creating a depression in the substrate 36 prior to depositing the film used to fabricate the cantilever arm 32 and cantilever base 34. Alternatively, the stylus 39 could be deposited on the cantilever arm 32 after the arm is formed. In either case, the stylus may be conical, pyramidal or similarly shaped. Preferably, the construction of the contact sensor assembly will be incorporated in a batch fabrication process which enables rapid, low cost production of the assembly.

The size and configuration of the contact sensor assembly may be determined from the required operating characteristics of the storage system. Lateral resolution, vertical resolution and data rate will all guide the design of the assembly. Generally, lateral resolution is determined by the size of the stylus tip. Using conventional fabrication techniques, lateral resolutions from 50 angstroms to atomic resolution have been demonstrated. Vertical resolution and data rate are determined principally by the characteristics of the cantilever arm itself. Vertical resolutions of an angstrom or less have been obtained. This will be more than adequate for data storage purposes where topographic variations of the media will be on the order of 100 angstroms to provide a good signal to noise ratio.

The nominal data rate limit of the contact sensor may be determined by assuming the cantilever arm operates as an undamped cantilever spring which is caused to vibrate under the action of a force applied laterally at its tip. The second order linear differential equation governing the undamped simple harmonic motion of the cantilever is given as:

$$m \frac{d^2 x}{dt^2} + kx = 0$$

where x is the lateral deflection of the cantilever tip, m is the cantilever mass and k is the cantilever spring constant. From this equation, the resonant angular frequency of the cantilever arm is given by the relationship:

$$w^2 = k/m$$

In the free vibrational mode, the mechanical response time of the cantilever arm to return from the fully deflected state to the undeflected state may be determined by the relationship:

$$T = 2\pi/w$$

This corresponds to a nominal data rate limit of $f_0 = 1/T$ which, in the free vibration mode at resonant frequencies, is limited by the cantilever's inertial mass. Thus, it may appear that data rates in excess of the resonant frequency may not be obtained since the response of the cantilever arm must be sufficient to maintain the stylus in contact with the media. However, it is also true that the required condition wherein the tip of the cantilever follows the media surface may be obtained by maintaining the force exerted on the cantilever at a level which increases the resonant tip acceleration at all times. Thus, given a media whose topography includes a series of surface incongruances of height h, increased data rates may be obtained if the cantilever is loaded a distance $z_L \gg h$, so that the applied force is roughly $kz_L$. Under these conditions, the acceleration a of the tip as it encounters a surface incongruance is given by the relationship:

$$a = F/m = kz_L/m = w^2 z_L$$

The time t for the cantilever to move a distance h as the incongruance passes the stylus is given by the relationship:

$$h = \tfrac{1}{2} at^2$$

Applying these relationships, the time required for the cantilever to deflect across the distance h of the surface incongruance may be determined in relation to the resonant frequency using the relationship:

$$t = \frac{1}{2\pi f_0} (2h/z_L)^{1/2}$$

Now, considering a series of sequential peaks and valleys varying sinusoidally on the media surface at a frequency $f_{signal}$, the sinusoidal variation having a peak to peak amplitude of h, it will be observed that the relationship between the signal frequency $f_{signal}$ and the resonant frequency $f_0$ is given by the relationship:

$$f_{signal} < f_0 (2z_L/h)^{1/2} \text{ or}$$

$$f_{signal} < 0.46 (F_1/mh)^{1/2}$$

Thus, although the signal frequency $f_{signal}$ is proportional to the natural resonance frequency $f_o$ of the cantilever, it can actually be substantially greater than the natural frequency if $z_L \gg h$. It will be further noted that for a given amount of load on the cantilever tip and a given feature depth, the only relevant parameter is the mass of the cantilever-stylus assembly, which should be as small as possible. Using conventional microfabrication techniques, it is possible to make cantilevers with a mass as low as $10^{-9}$ g.

To calculate the data rate, a value for the load is assumed. Using an average pressure of 10 GPa and a contact radius of 50 angstroms, a load of $10^{-6}$ N may be assumed. This load is applied to an assumed rectangular Si cantilever of dimensions 50 microns times 10 microns times 1 micron, which is well within the range of cantilever dimensions producible using known microfabrication techniques. If a feature depth of 10 nm is selected, the signal frequency $f_{signal}$ is determined to be 4.3 MHz. Assuming standard coding techniques are employed, for example, a (2, 7) code, the calculated data rate is approximately 13 Mbit/sec. Because the spring constant k is about 2.5 N/m, a loading distance $z_L$ of 0.4 microns needs to be maintained. Loading distances in this range can be readily maintained with piezoelectric positioners. With stylus forces in the range of $10^{-6}$ N, the sharpness of the stylus tip is somewhat limited. However, tip sizes providing resolutions in the 100 angstroms range can easily withstand such pressures. It is expected that run-out caused by media warpage or other construction imperfections will change the loading force on the cantilever arm. However, an air-bearing spindle can be used to reduce the repeatable run-out, and the run-out can easily be accounted for by incorporating a piezoelectric tube or bimorph in the support system 9.

Alternatively, the problem of run-out may be advantageously avoided by placing the microfabricated cantilever on a weak suspension and/or an air-bearing slider. Thus, the support system 9 may include a conventional slider 40 (FIG. 1) mounted on a conventional suspension 41 of the well known type used in Winchester disk drives. The slider 40 flies at a fixed height above the surface of the storage medium 4, so that it tracks the low frequency variations in disk height. The high frequency variations in topography due to the encoded data will give rise to deflection of the cantilever 10 as before. The load on the cantilever will be determined by the angle and height at which the cantilever is placed on the slider 40, as well as the fly height. By choosing the appropriate geometry, the load will be maintained at a predetermined value, independent of disk run-out. Similarly, the microfabricated cantilever could be placed directly on the suspension 41, whose spring constant and resonant frequency would then be selected to be much lower than the cantilever's. As the disk moves up and down due to run-out, the suspension 41 will deflect much more than the cantilever, so that the load on the cantilever will remain nearly constant. Again, the suspension 41 will not be able to respond to the high frequency variations due to the data, which will be detected by the microfabricated cantilever. In this case, the loading force on the cantilever will be given by the product of the spring constant of the suspension and the loading distance.

Other data rate issues are the frequency response of the deflection detector and the signal-to-noise ratio at a given bandwidth. FIG. 1 illustrates an optical detector incorporating the optical source/detection module 16. Using conventionally available optical detection apparatus, sensitivities in the range of $10^{-4}$ angstroms/Hz$^{1/2}$ may be obtained. Since this noise is the shot noise limit, even higher sensitivity can be obtained with higher optical power. Thus, if a $20_{db}$ signal-to-noise ratio is required on a 100 angstrom feature, then the signal-to-noise ratio may be calculated in accordance with the relationship:

$$S/N = 20 \log 100/(10^{-4} B^{1/2}) = 20_{dB}$$

at B=10 GHz

Thus, the signal-to-noise ratio is easily achieved for a detector with this noise level. A more serious limitation would be the frequency response of the particular detector used. In the case of optical beam deflection, photo detectors can be operated at many MHz.

Figure 5:
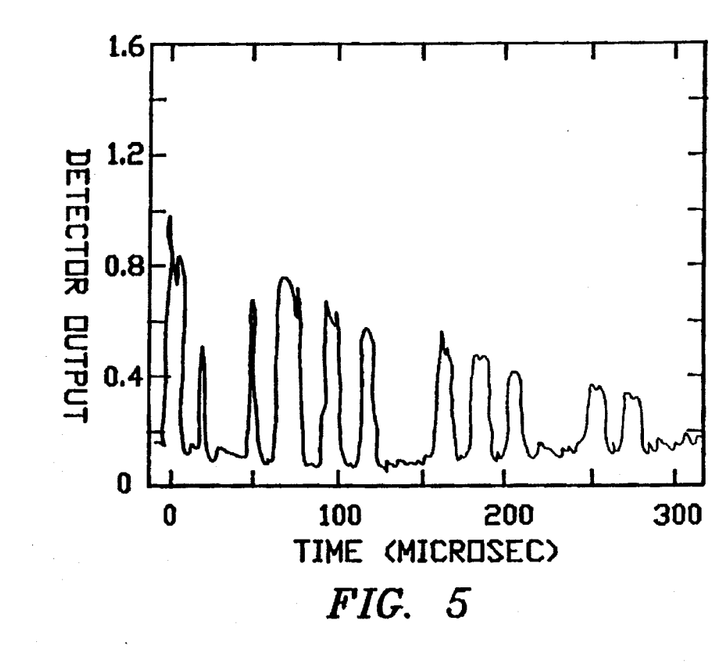
FIG. 5 is a graph illustrating the cantilever response rate in a data storage system constructed in accordance with the present invention.
Figure 6:
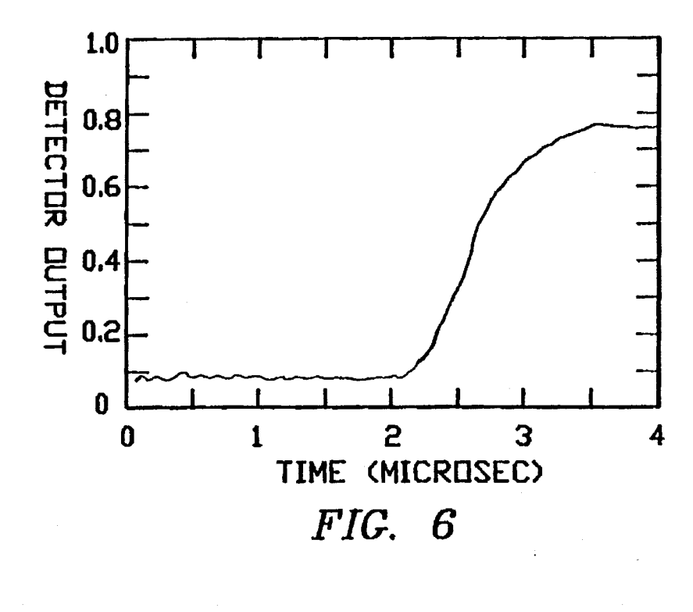
FIG. 6 is a more detailed view of a portion of the graph of FIG. 5.

An opto-mechanical storage system constructed in accordance with the present invention has been tested to evaluate the characteristics of a practical system. The system was constructed in accordance with FIG. 1 using a dual-legged triangular cantilever arm made with commercially available silicon nitride, together with a silicon nitride stylus. The cantilever had a resonant frequency of about 90 KHz. The sample was a test sample for a scanning electronic microscope SEM which had a pattern of two micron deep grooves etched into it. FIGS. 5 and 6 illustrate the response of the cantilever as the medium was spun at 2400 rpm (about 0.4 m/sec. at the radius used). As illustrated in FIG. 6, the rise and fall times were about 1 microsecond. Based on the equations set forth above, shallower features would be expected to reduce the response time, as would smaller, stiffer cantilevers.

Figure 7:
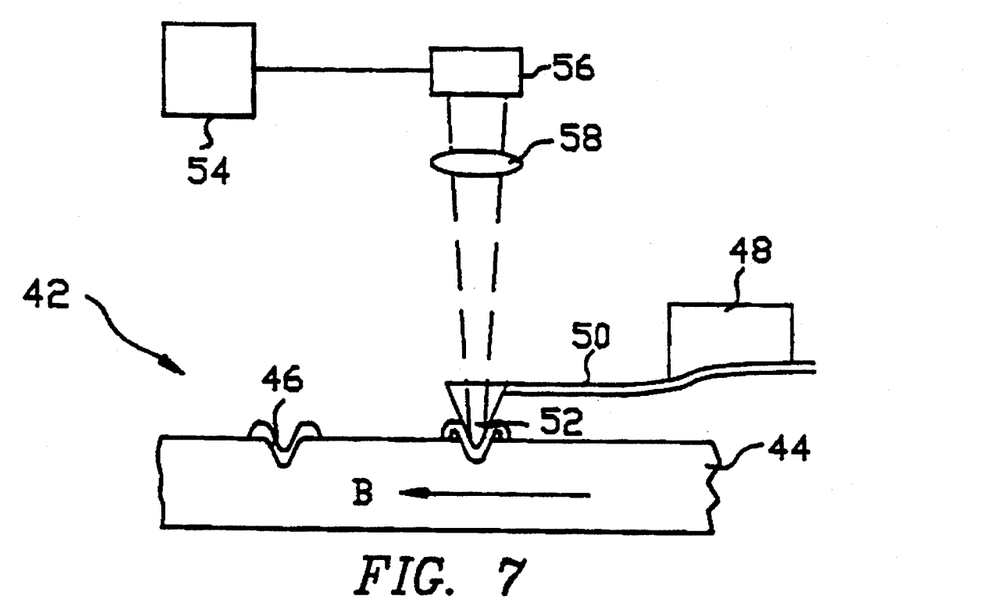
FIG. 7 is a diagrammatic side view of a system for writing topographic data to a storage medium in accordance with another aspect of the present invention.
Figure 8:
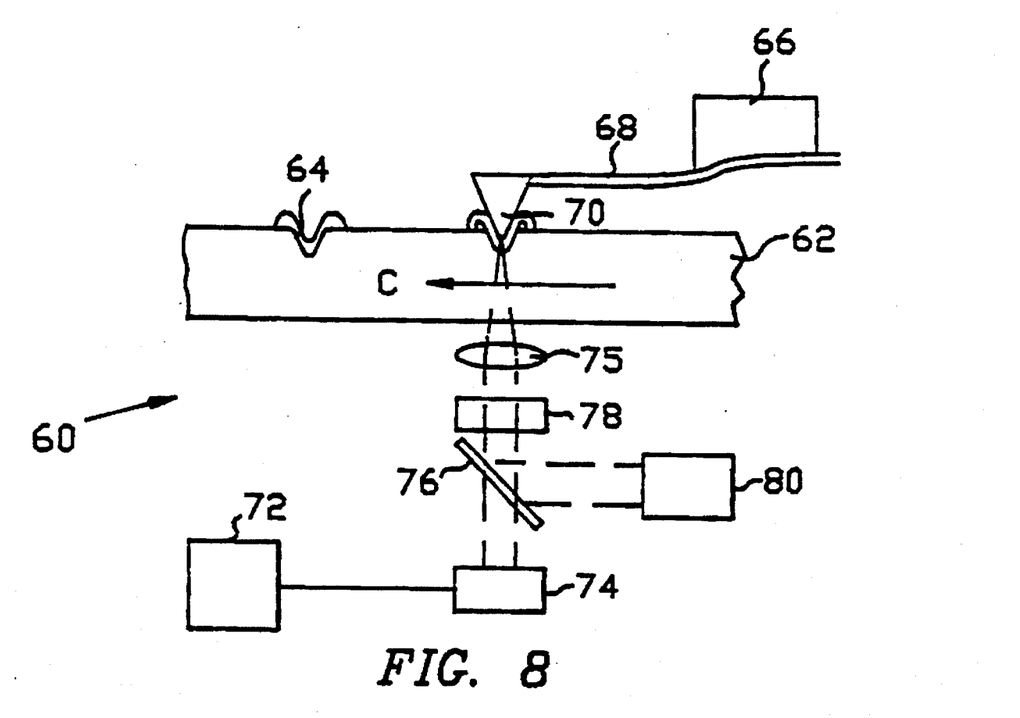
FIG. 8 is a diagrammatic side view of a system for writing topographic data to a storage medium in accordance with a still further aspect of the present invention.

Turning now to FIGS. 7 and 8, an alternative embodiment of the present invention is illustrated which includes a data writing capability. Thus, a data storage system 42 includes a rotatable storage medium 44 mounted for rotation about an axis (not shown) in the direction of the arrow labeled B. The storage medium 44 has an initially flat surface topography upon which incongruances 46 may be imprinted in a pattern to define machine readable information. As in the case of the previously described storage medium 4, the storage medium 44 is preferably formed from a polymer substrate such as one of the methyl methacrylates, PMMA, for example. As in the system of FIG. 1, there is positioned above the storage medium 44 a contact sensor 48 including a cantilever arm 50 and a stylus 52. The contact sensor 48 is positioned above the storage medium 44 such that an initial load deflection is imparted to the cantilever arm 50 and a load force is applied to the stylus 52. It will be understood that the storage system 42 includes data read hardware such as the detector system of FIG. 1. This data read hardware, however, is not shown in FIG. 7 in order to clearly illustrate the data writing elements thereof. These elements include a laser power source 54 providing a pulsed output signal. The pulsed output signal is provided to a diode laser 56 to produce a pulsed infrared laser output which is directed through a lens 58. The lens 58 focuses the laser beam on the upper side of the cantilever arm 50, behind the stylus 52. Preferably, the stylus 52 is coated with a light absorbing material such that its tip heats up as a result of the incident laser beam energy. With the stylus 52 in contact with the medium 44, the heat will transfer to the medium and raise its temperature. If the medium is of a low melting point material, or has a low-temperature softening point, such as PMMA, the loading force present on the stylus 52 combined with the heating from the laser will cause the tip of the stylus 52 to sink into the medium 44, thus forming a pit. By rotating the storage medium under the stylus 52, and controllably driving the laser 56, a series of incongruances 46 may be created in the medium 44 in a pattern corresponding to the frequency and intensity of the laser pulses. In a test using a non-rotating PMMA substrate, a 30 milliwatt, 30 microsecond pulse and a loading force of about $10^{-7}$ N, a pit was formed in the medium 44 having a diameter of about 1,400–2,000 angstroms. In addition to the pit, a ridge of displaced substrate material was formed around the pit such that approximately half of the diameter represented the pit and half represented the ridge. Reducing the laser power leads to shallower and correspondingly narrow pits. For example, pits as small as 700 angstroms across and 300 angstroms deep can be made. In addition, marks may be made with laser pulses as short as 1 microsecond with a 5 microsecond duty cycle.

It will be understood that alternative methods for heating the stylus can be used. FIG. 8 illustrates a storage system 60 wherein stylus tip heating may be accomplished more efficiently from below the storage medium 62. Again, the storage medium 62 is rotatable about an axis for relative movement in the direction of the arrow labeled C. The storage medium 62 includes a series of surface incongruances 64 which may be formed in a pattern defining machine readable information. A contact sensor 66 positioned above the storage medium 62 includes a cantilever arm 68 and a stylus 70. The contact sensor 66 is positioned above the storage medium 62 at a distance sufficient to impart a pre-load deflection on the cantilever arm 68 and a pre-load force on the stylus 70. Positioned below the storage medium 62 is a laser power supply 72 providing a pulsed output signal to a laser source 74. The laser source 74 produces a pulsed infrared laser output beam which is focused by a focusing lens 75 on the stylus 70. Again, controlled pulsing of the laser 74 results in a surface topographic pattern in the storage medium defined by the frequency and intensity of the laser pulses.

An advantage of the data storage system of FIG. 8 is that data write and data read functions may be combined. Thus, a beam splitter 76 and quarter-waveplate 78 may be placed in the path of the infrared laser beam emitted by the laser source 74. The beam splitter 76 passes the incident beam to the stylus 70. By proper selection of materials, the reflective properties of the stylus 70 and the medium 62 may be utilized to generate a reflective diffraction pattern having at least one interference peak aligned with the beam splitter 76. This high intensity reflected light is deflected by the beam splitter to a light sensitive diode detector 80 by virtue of the change in polarization provided by the quarter-waveplate 78. When the stylus 70 is displaced into an incongruance 64, the intensity of the reflected beam is modulated due to optical interference between light reflected off the cantilever and light reflected off the surface of the disk. This intensity modulation is detected at light sensitive diode 80. In this manner, an intensity modulated signal corresponding to changes in stylus position can be produced. In principle, the reflected light off the surface of the disk will also be affected by the presence of the data features. As these are much smaller in depth and spatial extent than the wavelength of the laser light, this effect will be small compared to the dominant interference between the disk and the cantilever. In the data read mode, the laser source 74 may be operated at a relatively low power level so that substantial stylus heating will not occur. When the data write mode is selected, the power level of the laser source may be increased to provide sufficient stylus heating.

Accordingly, although several preferred embodiments of an high density data storage system with a topographic contact sensor have been disclosed, it will be understood and appreciated that modifications and adaptations will occur to persons skilled in the art. For example, as an alternative to infrared laser heating in the data write mode, it may also be possible to integrate a miniature resistive-heater into the stylus for variably heating and deflecting the stylus toward the storage medium to write data thereto. In addition, media materials other than PMMA may well prove satisfactory in the storage system herein. Structures with integrated optical detection systems could also be used for detecting cantilever deflections. With an integrated sensor, it should be possible to use multiple tips for highly parallel operation. Also, the deflection of the cantilever could be sensed capacitively or inductively. For example, the cantilever could form one plate of a capacitive sensor, or could operate in conjunction with an inductive coil. Moreover, the contact sensor could include a piezoresistive element to detect topographic changes in the storage medium. Therefore, the protection afforded the invention should not be limited except in accordance with the spirit of the appended claims and their equivalents.

I claim:

1. A data storage system, comprising:

a storage medium having formed thereon a surface topography defining machine readable information;

means for rotating said storage medium about a drive axis;

servoless high resolution contact sensor means for engaging and contacting said storage medium and deflecting back and forth to follow said surface topography when said storage medium is rotated, said contact sensor means being configured to read stored data at a signal frequency of at least 5 Mhz, and including a cantilever arm and a stylus mounted at one end of said cantilever arm;

a light reflective surface on said cantilever arm adjacent said stylus;

light source means for directing a light beam to said light reflective surface;

light detecting means for detecting light reflected from said light reflective surface from said light source and for generating an output signal representative of the deflection of said cantilever arm caused by said surface topography; and circuit means for receiving said output signal and converting said output signal to digital data signals representative of the machine readable information formed by the surface topography on said medium.

2. The data storage system of claim 1 wherein said circuit means also convert said output signal to tracking error signals representative of a radial position of said cantilever relative to said surface.

3. The data storage system of claim 1 wherein said circuit means generates a data signal and a tracking error signal in response to said output signal, said data signal corresponding to the information defined by said surface topography, and said tracking error signal providing information indicative of a radial position of said cantilever relative to said surface.

4. The data storage system of claim 2 wherein said storage medium topography includes a plurality of rounded surface incongruances, and wherein said cantilever deflects vertically when engaging a central portion of said surface incongruances and twists laterally when engaging an off-center portion of said surface incongruances, and wherein said detector means senses track position by measuring the degree of cantilever twist.

5. The data storage system of claim 4 wherein said detector means senses cantilever twist from said reflected light and generates a corresponding output signal representative thereof.

6. The data storage system of claim 5 wherein said detector means includes a quadrant detector containing four light sensing elements for measuring the vertical displacement of said cantilever and for measuring a lateral twist displacement of said cantilever.

7. The data storage system of claim 6 wherein said quadrant detector includes four light sensing elements A, B, C, and D, each generating a signal responsive to the intensity of said reflected light thereon, and wherein said circuit means generates a data signal by comparing the signals generated by said detector elements in accordance with the relationship:

$$((A+B)-(C+D))/(A+B+C+D).$$

8. The data storage system of claim 7 wherein said circuit means further generates a tracking error signal by comparing the signals generated by said detector elements in accordance with the relationship:

$$((A+C)-(B+D))/(A+B+C+D).$$

9. The data storage system of claim 1 further including data writing means for softening said storage medium and writing data to localized portions of said storage medium that have been selectively softened.

10. The data storage system of claim 9 wherein said data writing means includes said contact sensor means.

11. The data storage system of claim 9 wherein said data writing means includes a laser source positioned to direct a variable intensity laser beam to said stylus for variably heating said stylus and a localized portion of said storage medium in contact therewith to cause said stylus to deflect toward said storage medium to write data thereto.

12. The data storage system of claim 1 wherein said cantilever is batch-fabricated on a single chip.

13. A data storage system, comprising:

a data storage medium having formed thereon a surface topography defining machine readable information;

servoless high resolution contact sensor means for engaging and contacting said storage medium and deflecting back and forth to follow said surface topography when said storage medium is moved, said contact sensor means being configured to read stored data at a signal frequency of at least 5 Mhz, and including a microfabricated cantilever arm and a stylus mounted at one end of said cantilever arm;

means for providing relative motion between said storage medium and said contact sensor means;

detector means for detecting deflections of said contact sensor means caused by said surface topography and for generating an output signal representative of the deflections of said contact sensor means; and circuit means for receiving said output signal and converting said output signal to digital data signals representative of the machine readable information formed by said surface topography.

14. The data storage system of claim 13 further including data writing means for writing data to said storage medium.

15. The data storage system of claim 14 wherein said data writing means includes a laser source positioned to direct a variable intensity laser beam to said stylus for variably heating said stylus and a localized portion of said storage medium in contact therewith to cause said stylus to deflect toward said storage medium to write data thereto.

16. The data storage system of claim 15 wherein said stylus is positioned on one side of said data storage medium and said laser source is positioned on an opposing side of said data storage medium.

17. The data storage system of claim 13 wherein said microfabricated cantilever arm is placed on an air-bearing slider which is configured to fly over said data storage medium and maintain constant load on the cantilever in the presence of media warpage and run-out.

18. The data storage system of claim 13 wherein said microfabricated cantilever is placed onto a suspension which is configured to be sufficiently weak to bend in the presence of media warpage or run-out to keep nearly constant load on the cantilever.

19. The data storage system of claim 15 wherein said data writing means includes a resistive heater for variably heating and deflecting said stylus toward said storage medium to write data thereto.

20. The data storage system of claim 16 wherein said stylus and data storage medium are configured to generate optical interference between light reflected off one side of the medium and light reflected off the cantilever, wherein said detector means is positioned so as to sense a change in intensity of the reflected light due to the change in interference as said stylus deflects over said data storage medium.

21. The data storage system of claim 16 wherein said stylus and data storage medium are configured to generate a reflective diffraction pattern having at least one interference peak in response to light from said laser source, and wherein said detector means is positioned to sense a shift in the position of said interference peak as said stylus deflects over said data storage medium.

22. The data storage system of claim 16 wherein said detector means includes a beam splitter and a quarter-waveplate positioned to receive light emitted by said laser source and to transmit said light to said stylus and data storage medium, and wherein said detector means further includes a light sensitive detector positioned to receive light reflected from said stylus and data storage medium and deflected by said beam splitter to said detector, said data storage system further including means for generating a low laser power level when data is read from said data storage medium and for generating a high laser power level when data is written to said data storage medium.

23. A method for reading data from an information-containing rotatable storage medium mounted for rotation about a central drive axis, said storage medium having formed thereon a surface topography defining machine readable information, said method comprising the steps of:

rotating said storage medium at a predetermined rotational speed;

positioning a high resolution contact sensor adjacent to said storage medium, said contact sensor including a microfabricated cantilever arm and a stylus mounted at one end of said cantilever arm, said contact sensor being configured to read stored data at a signal frequency of at least 5 Mhz, and said contact sensor further being positioned such that said stylus engages and contacts said storage medium and follows said surface topography as said storage medium is rotated;

detecting the movement of said contact sensor resulting from topographic changes in said storage medium; and producing an output signal from said detecting step containing machine readable information corresponding to the information contained on said storage medium.

24. The method set forth of claim 23 wherein said contact sensor includes a light reflective surface formed on said cantilever arm adjacent said stylus, and wherein said detecting step includes positioning an optical source to direct a light beam to said light reflective surface and positioning a light detector to detect light reflected from said light reflective surface from said light source.

25. The method of claim 23 further including the step of controlling said contact sensor to write data to said storage medium.

26. The method of claim 25 wherein said contact sensor is controlled to heat and soften localized portions of said storage medium and to alter the surface topography of said storage medium to write data thereto.

27. The method of claim 23 wherein said cantilever has a resonant frequency and is positioned at a distance from said storage medium sufficient to enable said stylus to track the topography of said storage medium at a frequency in excess of said resonant frequency.

28. The method of claim 23 wherein said contact sensor includes a piezoresistive element to detect topographic changes in said storage medium.

29. An opto-mechanical data storage system, said system comprising:

a rotatable storage medium having formed thereon a plurality of data tracks containing rounded surface incongruances defining a plurality of machine readable information;

means for rotating said storage medium about a drive axis;

a high resolution contact sensor mounted adjacent said storage medium, said contact sensor including a microfabricated cantilever arm and a stylus mounted at one end of said cantilever arm, said stylus being positionable to engage said storage medium and to follow said data tracks when said storage medium is rotated;

a light reflective surface formed on said cantilever arm adjacent said stylus;

a laser source positioned above said cantilever arm to direct a laser beam to said light reflective surface;

a light detector positioned to detect the laser beam reflected from said light reflective surface from said laser source and to generate an output signal in response thereto;

said light detector including a sensor for sensing lateral position shifts of said reflected laser beam resulting from vertical deflections of said cantilever arm imparted by said storage medium incongruances and twisting movements of said cantilever arm resulting from an off-track positioning of said stylus; and said cantilever arm having a resonant frequency and said cantilever arm being positioned relative to said storage medium to track said surface incongruances at a frequency in excess of said resonant frequency.

30. A data storage system, comprising:

a storage medium having formed thereon a surface topography defining machine readable information;

means for rotating said storage medium about a drive axis;

high resolution contact sensor means for engaging said storage medium and deflecting back and forth to follow said surface topography when said storage medium is rotated, including a cantilever arm and a stylus mounted at one end of said cantilever arm;

a light reflective surface on said cantilever arm adjacent said stylus;

light source means for directing a light beam to said light reflective surface;

light detecting means for detecting light reflected from said light reflective surface from said light source and for generating an output signal representative of the deflection of said cantilever arm;

circuit means for receiving said output signal and converting said output signal to data signals representative of the machine readable information formed by the surface topography on said medium, said circuit means including means for converting said output signal to tracking error signals representative of a radial position of said cantilever relative to said surface;

said storage medium topography including a plurality of rounded surface incongruences, and said cantilever deflecting vertically when engaging a central portion of said surface and incongruences and twisting laterally when engaging an off-center portion of said surface incongruences; and said detector means including means for sensing track position by measuring the degree of cantilever twist.

31. The data storage system of claim 30 wherein said detector means senses cantilever twist from said reflected light and generates a corresponding output signal representative thereof.

32. The data storage system of claim 31 wherein said detector means includes a quadrant detector containing four light sensing elements for measuring the vertical displacement of said cantilever and for measuring a lateral twist displacement of said cantilever.

33. The data storage system of claim 32 wherein said quadrant detector includes four light sensing elements A, B, C, and D, each generating a signal responsive to the intensity of said reflected light thereon, and wherein said circuit means generates a data signal by comparing the signals generated by said detector elements in accordance with the relationship:

$$((A+B)-(C+D))/(A+B+C+D).$$

34. The data storage system of claim 33 wherein said circuit means further generates a tracking error signal by comparing the signals generated by said detector elements in accordance with the relationship:

$$((A+C)-(B+D))/(A+B+C+D).$$

35. A data storage system, comprising:

a storage medium having formed thereon a surface topography defining machine readable information;

means for rotating said storage medium about a drive axis;

high resolution contact sensor means for engaging said storage medium and deflecting back and forth to follow said surface topography when said storage medium is rotated, including a cantilever arm and stylus mounted at one end of said cantilever arm, said contact sensor means being configured to read stored data at a signal frequency of at least 5 MHz;

a light reflective surface on said cantilever arm adjacent said stylus;

light source means for directing a light beam to said light reflective surface;

light detecting means for detecting light reflected from said light reflective surface from said light source and for generating an output signal representative of the deflection of said cantilever arm; and circuit means for receiving said output signal and converting said output signal to data signals representative of the machine readable information formed by the surface topography on said medium.

36. A data storage system, comprising:

a data storage medium having formed thereon a surface topography defining machine readable information;

high resolution contact sensor means for engaging said storage medium and deflecting back and forth to follow said surface topography when said storage medium is moved, including a microfabricated cantilever arm and a stylus mounted at one end of said cantilever arm;

means for providing relative motion between said storage medium and said contact sensor means;

detector means for detecting deflections of said contact sensor means caused by said surface topography and for generating an output signal representative of the deflections of said contact sensor means;

circuit means for receiving said output signal and converting said output signal to data signals representative of the machine readable information formed by said surface topography; and data writing means for writing data to said storage medium, said data writing means including a laser source positioned to direct a variable intensity laser beam to said stylus for variably heating said stylus and a localized portion of said storage medium in contact therewith to cause said stylus to deflect towards said storage medium to write data thereto.

37. The data storage system of claim 36 wherein said stylus is positioned on one side of the data storage medium and said laser source is positioned on an opposing side of said data storage medium.

38. The data storage system of claim 36 wherein said stylus and data storage medium are configured to generate optical interference between light reflected off one side of the medium and light reflected off the cantilever, wherein said detector means is positioned so as to sense a change in intensity of the reflected light due to the change in interference as said stylus deflects over said data storage medium.

39. The data storage system of claim 36 wherein said stylus and data storage medium are configured to generate a reflective diffraction pattern having at least one interference peak in response to light from said laser source, and wherein said detector means is positioned to sense a shift in the position of said interference peak as said stylus deflects over said data storage medium.

40. The data storage system of claim 36 wherein said detector means includes a beam splitter and a quarter-wave plate positioned to receive light emitted by said laser source and transmit said light to said stylus and data storage medium, and wherein said detector means further includes a light sensitive detector positioned to receive light reflected from said stylus and data storage medium and deflected by said beam splitter to said detector, said data storage system further including means for generating a low laser power level when data is read from said data storage medium and for generating a high laser power level when data is written to said storage medium.

41. The data storage system of claim 36 wherein said contact sensor includes:

a light reflective surface on said cantilever arm adjacent said stylus;

a light source for directing a light beam to said light reflective surface;

light detecting means for detecting light reflected from said light reflective surface from said light source and for generating an output signal representative of the deflection of said cantilever arm.

42. The data storage system of claim 36 wherein said contact sensor includes a piezoresistive element to detect topographic changes in said storage medium.

43. A method for reading data from an information-containing rotatable storage medium mounted for rotation about a central drive axis, said storage medium having formed thereon a surface topography defining machine readable information, said method comprising the steps of:

rotating said storage medium at a predetermined rotational speed; and positioning a high resolution contact sensor adjacent to said storage medium, said contact sensor including a microfabricated cantilever arm and a stylus mounted at one end of said cantilever arm, said contact sensor being positioned such that said stylus engages said storage medium and follows said surface topography as said storage medium is rotated, said cantilever having a resonant frequency and being positioned at a distance from said storage medium sufficient to enable said stylus to track the topography of said storage medium at a frequency in excess of said resonant frequency;

detecting the movement of said contact sensor resulting from topographic changes in said storage medium; and producing an output signal from said detecting step containing machine readable information corresponding to the information on said storage medium.

44. A method for reading data from an information-containing rotatable storage medium mounted for rotation about a central drive axis, said storage medium having formed thereon a surface topography defining machine readable information, said method comprising the steps of:

rotating said storage medium at a predetermined rotational speed;

positioning a high resolution contact sensor adjacent to said storage medium, said contact sensor including a microfabricated cantilever arm and a stylus mounted at one end of said cantilever arm, said contact sensor being positioned such that said stylus engages said storage medium and follows said surface topography as said storage medium is rotated, said contact sensor beam configured to read stored data at a signal frequency of at least 5 MHz;

detecting the movement of said contact sensor resulting from topographic changes in said storage medium; and producing an output signal from said detecting step containing machine readable information corresponding to the information contained on said storage medium 45. A data storage system, comprising:

a storage medium having formed thereon a surface topography defining machine readable information;

means for rotating said storage medium about a drive axis;

high resolution contact sensor means for engaging said storage medium and deflecting back and forth to follow said surface topography when said storage medium is rotated, including a cantilever arm and a stylus mounted at one end of said cantilever arm;

a light reflective surface on said cantilever arm adjacent said stylus;

light source means for directing a light beam to said light reflective surface;

light detecting means for detecting light reflected from said light reflective surface from said light source and for generating an output signal representative of the deflection of said cantilever arm;

circuit means for receiving said output signal and converting said output signal to data signals representative of the machine readable information formed by the surface topography on said medium; and data writing means for softening said storage medium and writing data to portions of said storage medium that have softened, said data writing means including a laser source positioned to direct a variable intensity laser beam to said stylus for variably heating said stylus and a localized portion of said storage medium in contact therewith to cause said stylus to deflect towards said storage medium to write data thereto.

46. A data storage system, comprising:

a data storage medium having formed thereon a surface topography defining machine readable information;

high resolution contact sensor means for engaging said storage medium and deflecting back and forth to follow said surface topography when said storage medium is moved, including a microfabricated cantilever arm and a stylus mounted at one end of said cantilever arm;

means for providing relative motion between said storage medium and said contact sensor means;

detector means for detecting deflections of said contact sensor means caused by said surface topography and for generating an output signal representative of the deflections of said contact sensor means;

circuit means for receiving said output signal and converting said output signal to data signals representative of the machine readable information formed by said surface topography; and a resistive heater for variably heating said stylus and a localized portion of said storage medium in contact therewith to cause said stylus to deflect towards said storage medium to write data thereto.

47. A data storage system, comprising:

a data storage medium having formed thereon a surface topography defining machine readable information;

servoless high resolution contact sensor means for engaging and contacting said storage medium and deflecting back and forth to follow said surface topography when said storage medium is moved, said contact sensor means including a microfabricated cantilever arm and a stylus mounted at one end of said cantilever arm;

a drive for providing relative motion between said storage medium and said contact sensor means;

a detector for detecting deflections of said contact sensor means caused by said surface topography and for generating an output signal representative of the deflections of said contact sensor means;

a circuit for receiving said output signal and converting said output signal to digital data signals representative of the machine readable information formed by said surface topography;

said storage medium topography including a plurality of rounded surface incongruances, and said cantilever deflecting vertically when engaging a central portion of said surface incongruances and twisting laterally when engaging an off-center portion of said surface incongruances; and said detector being configured for sensing track position by measuring the degree of cantilever twist.

48. A method for reading data from an information-containing rotatable storage medium mounted for rotation about a central drive axis, said storage medium having formed thereon a surface topography defining machine readable information, said method comprising the steps of:

rotating said storage medium at a predetermined rotational speed;

positioning a high resolution contact sensor adjacent to said storage medium, said contact sensor including a microfabricated cantilever arm and a stylus mounted at one end of said cantilever arm, said contact sensor being positioned such that said stylus engages and contacts said storage medium and follows said surface topography as said storage medium is rotated;

detecting the movement of said contact sensor resulting form topographic changes in said storage medium;

producing an output signal from said detecting step containing machine readable information corresponding to the information contained on said storage medium;

said storage medium topography including a plurality of rounded surface incongruances, and said cantilever arm deflecting vertically when engaging a central portion of said surface incongruances and twisting laterally when engaging an off-center portion of said surface incongruances; and said detecting step including sensing track position by measuring the degree of cantilever twist.

49. A data storage system, comprising:

a data storage medium having formed thereon a surface topography defining machine readable information;

high resolution contact sensor means for engaging said storage medium and deflecting back and forth to follow said surface topography when said storage medium is moved, including a microfabricated cantilever arm and a stylus mounted at one end of said cantilever arm;

means for providing relative motion between said storage medium and said contact sensor means;

detector means for detecting deflections of said contact sensor means caused by said surface topography and for generating an output signal representative of the deflections of said contact sensor means;

circuit means for receiving said output signal and converting said output signal to data signals representative of the machine readable information formed by said surface topography; and data writing means for writing data to said storage medium, said data writing means including means for maintaining a generally constant force on said stylus while variably heating said stylus and a localized portion of said storage medium in contact therewith to cause said stylus to deflect toward said storage medium to write data thereto.

50. The data storage system of claim 49 wherein said data writing means includes a focused laser source positioned to direct a variable intensity laser beam to said stylus for variably heating said stylus and a localized portion of said storage medium in contact therewith to cause said stylus to deflect towards said storage medium to write data thereto.

51. The data storage system of claim 49 wherein said data writing means includes a resistive heater for variably heating said stylus and a localized portion of said storage medium in contact therewith to cause said stylus to deflect towards said storage medium to write data thereto.

52. A method for reading and writing data from an information-containing rotatable storage medium mounted for rotation about a central drive axis, said storage medium having formed thereon a surface topography defining machine readable information, said method comprising the steps of:

rotating said storage medium at a predetermined rotational speed;

positioning a high resolution contact sensor adjacent to said storage medium, said contact sensor including a microfabricated cantilever arm and a stylus mounted at one end of said cantilever arm, said contact sensor being positioned such that said stylus engages and contacts said storage medium and follows said surface topography as said storage medium is rotated;

detecting the movement of said contact sensor resulting from topographic changes in said storage medium;

producing an output signal from said detecting step containing machine readable information corresponding to the information contained on said storage medium; and controlling said contact sensor to write data to said storage medium, said contact sensor being controlled by maintaining a generally constant force on said stylus while variably heating said stylus and a localized portion of said storage medium in contact therewith to cause said stylus to deflect toward said storage medium to write data thereto.

53. A system for marking a surface with topographic features, comprising:

a medium onto which the desired surface topography is to be formed;

a microfabricated cantilever arm and a stylus located at one end of said cantilever arm;

means for providing relative motion between said medium and said stylus;

marking means for producing surface topographic features on said medium, said marking means including means for maintaining a generally constant force on said stylus while variably heating said stylus and a localized portion of said medium in contact therewith to cause said stylus to deflect towards said medium to write topographic features thereto.

54. The marking system of claim 53, wherein said medium is comprised of a methylmethacrylate polymer.

55. A method for reading data from an information-containing storage medium, said storage medium having formed thereon a surface topography defining machine readable information, said method comprising the steps of:

positioning a high resolution contact sensor adjacent to said storage medium, said contact sensor including a microfabricated cantilever arm and a stylus mounted at one end of said cantilever arm, said contact sensor being positioned such that said stylus engages said storage medium and follows said surface topography, said cantilever having a resonant frequency and being positioned at a distance from such storage medium sufficient to enable said stylus to track the topography of said storage medium at a frequency in excess of said resonant frequency;

imparting relative motion between said storage medium and said contact sensor;

detecting the movement of said contact sensor resulting from topographic changes in said storage medium; and producing an output signal from said detecting step containing machine readable information corresponding to the information on said storage medium.

* * * * *

UNITED STATES PATENT AND TRADEMARK OFFICE
CERTIFICATE OF CORRECTION

PATENT NO. : 5,537,372
DATED : July 16, 1996
INVENTOR(S) : Albrecht et al.

It is certified that error appears in the above-indentified patent and that said Letters Patent is hereby corrected as shown below:

Claim 24, Column 11, line 66, delete "set forth".

Claim 44, Column 15, line 10, delete "and";
line 41, change "beam" to --being--.

Claim 48, Column 17, line 11, change "form" to --from--.

Signed and Sealed this

Twelfth Day of November, 1996

Attest:

BRUCE LEHMAN

Attesting Officer

Commissioner of Patents and Trademarks